No. 636,430. Patented Nov. 7, 1899.
F. & K. HIEKE.
CAVALRY EQUIPMENT.
(Application filed June 17, 1899.)
(No Model.) 2 Sheets—Sheet 1.
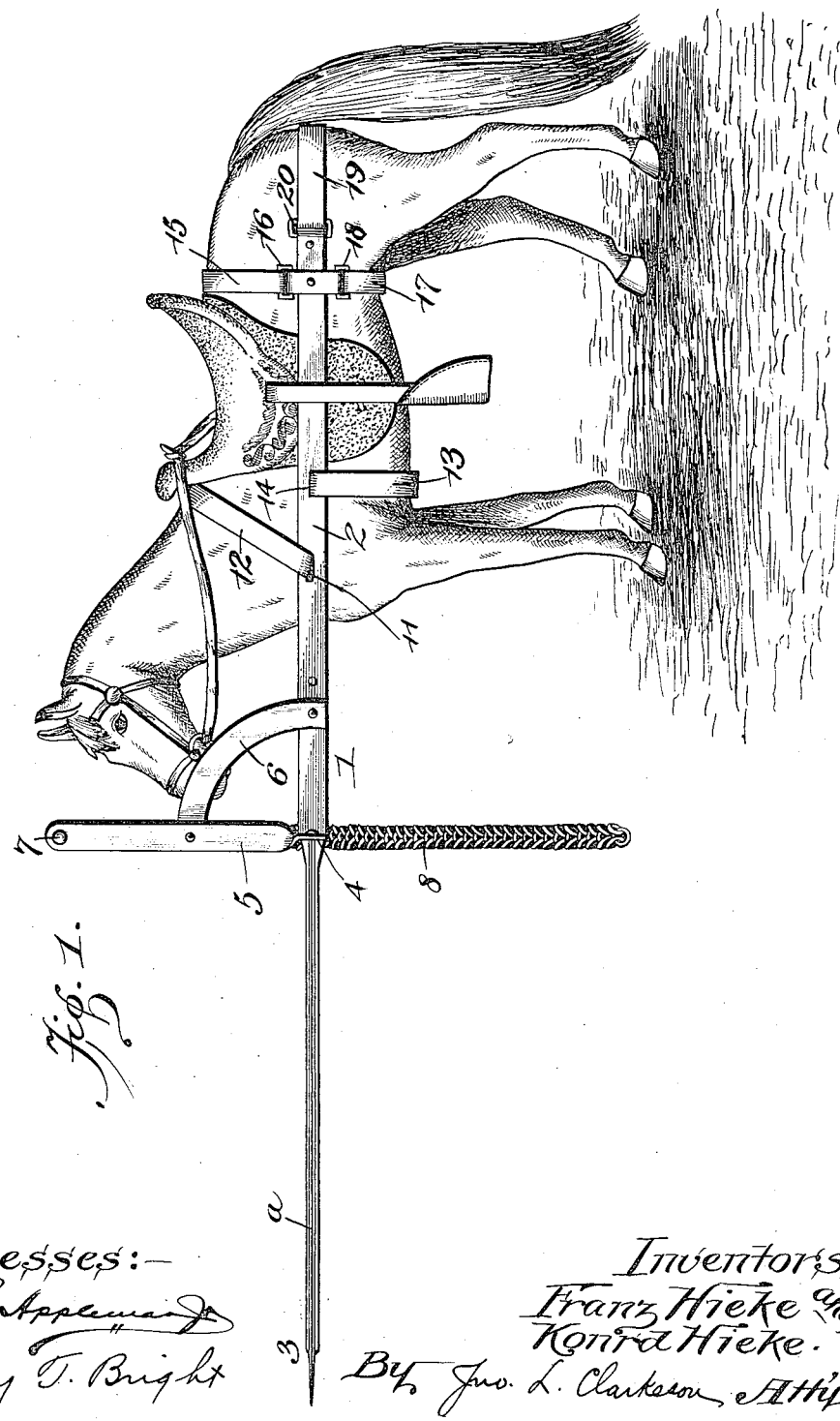

No. 636,430. Patented Nov. 7, 1899.
F. & K. HIEKE.
CAVALRY EQUIPMENT.
(Application filed June 17, 1899.)
(No Model.) 2 Sheets—Sheet 2.
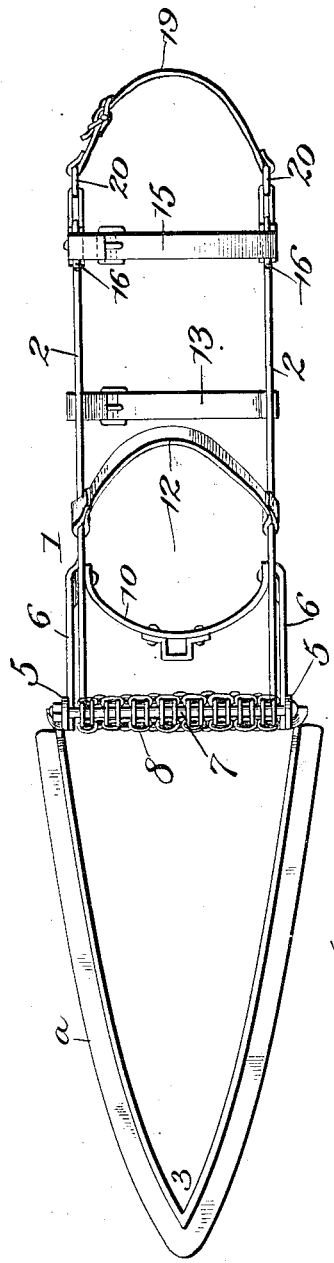
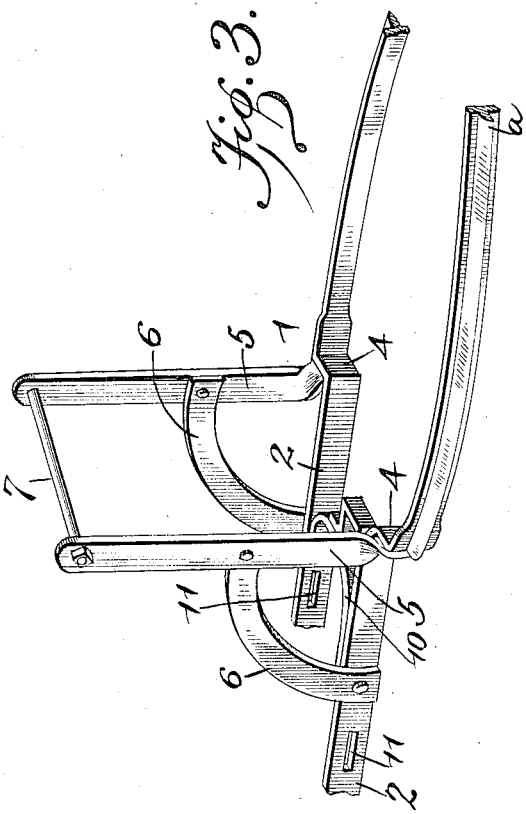

UNITED STATES PATENT OFFICE.

FRANZ HIEKE AND KONRAD HIEKE, OF PHILADELPHIA, PENNSYLVANIA.

CAVALRY EQUIPMENT.

SPECIFICATION forming part of Letters Patent No. 636,430, dated November 7, 1899.

Application filed June 17, 1899. Serial No. 720,978. (No model.)

*To all whom it may concern:*

Be it known that we, FRANZ HIEKE and KONRAD HIEKE, subjects of the Emperor of Austria-Hungary, residing at Philadelphia, in the county of Philadelphia and State of Pennsylvania, have invented certain new and useful Improvements in Cavalry Equipment; and we do hereby declare the following to be a full, clear, and exact description of the invention, such as will enable others skilled in the art to which it appertains to make and use the same.

This invention relates to cavalry equipment; and it has for its object the provision of novel means for protecting the horse from the missiles of the enemy and in the provision of a cutting projection designed to injure the enemy or cause him to evade the projection by stepping to one side where an attack by the rider would be effective.

A further object of the invention is to provide a device of this character which can be securely attached to the animal without inconvenience to the rider, and, furthermore, to make the same to possess comparatively little weight, that it will not interfere with rapid movement.

Furthermore, the object of the invention is to produce a device of the character noted which shall possess advantages in points of simplicity, efficiency, and durability, proving at the same time inexpensive.

With the above and other objects in view the invention consists in the details of construction and in the arrangement and combination of parts to be hereinafter more fully described, and specifically set forth in the annexed claims.

In disclosing the invention reference will be had to the accompanying drawings, forming part of this specification, wherein like characters of reference denote corresponding parts in the several views, in which—

Figure 1 is a view in side elevation of our invention applied to a horse. Fig. 2 is a top plan view illustrating the invention detached. Fig. 3 is a perspective view of the central part of the frame.

In the drawings, 1 indicates the frame, comprising in its construction two side pieces 2, designed to extend rearwardly to a point above the flank of the horse, and the forward ends of the side pieces extend a distance beyond the front of the horse, converging and terminating in a point 3. As will be understood, these side pieces may be formed of a single piece of metal or they may be composed of a plurality of parts. The forward extension of the side pieces is provided with a blade $a$, extending from the point to the standards, said blade being attached centrally of the outer surface and extending outwardly at right angles thereto. Shoulders 4 are formed intermediately of the length of the side pieces, and the standards 5 are bolted thereto. Segmental braces 6 extend from the side pieces to the standards for giving rigidity to the structure. A horizontal cross-rod 7 connects the standards at the top, and a chain mail 8 depends therefrom in front of the horse and rider. The mail is pivoted on the horizontal cross-rod, and the lower end thereof is free to swing outwardly should the feet or legs of the horse come in contact therewith. A curved brace 10 extends from one side piece to the other just in front of the breast of the horse, said brace serving to prevent spreading of the side pieces. It would also abut the breast should the impact on the extension be great. Slots 11 are cut in the side pieces, and a strap 12, extending over the withers of the horse, has its ends secured in the slots. The strap of course is made adjustable, that the point of the extension may be regulated. A belly-band 13 extends from one side piece to the other and is run through the slots 14 thereof. Securing-strap 15 passes over the rump of the horse and has its ends fastened in the links 16 on the side pieces, while a strap 17 passes under the horse and has its ends attached to links 18. A breech 19 engages the links 20 in each of the rear ends of the side pieces. By the several connections described and shown displacement of the device is improbable.

It will be noted that the manner of attaching the frame to the horse, the proportions, and other details of construction for successfully carrying the invention into practice may be variously modified, as will be apparent to one skilled in the art.

Having fully described our invention, what we claim as new, and desire to secure by Letters Patent, is—

1. A cavalry equipment comprising a frame, means for securing it to a horse, said frame having an extension adapted to protrude in front of a horse, and a blade secured on the extension.

2. In a cavalry equipment, a frame adapted to be attached to a horse, its front end converging and terminating in a point, and a cutter secured to the forward end of the frame.

3. In a cavalry equipment, two side pieces adapted to extend beyond the front of a horse, standards intermediately thereof, a cross-rod connecting the standards at the top and a mail-chain mounted on the cross-rod, substantially as described.

4. In a cavalry equipment, a frame comprising two side pieces, lying along the sides of a horse, means for securing the side pieces in place, blades on the forward converging ends of the side pieces, standards attached to the shoulders, a cross-rod connecting the tops of the standards and a chain mail depending loosely from the cross-rod.

In testimony whereof we affix our signatures in presence of two witnesses.

FRANZ HIEKE,
KONRAD HIEKE.

Witnesses:
 JNO. L. CLARKSON,
 W. S. WATSON.